United States Patent

[11] 3,614,660

[72] Inventor Casper J. Ultee
Glastonbury, Conn.
[21] Appl. No. 811,697
[22] Filed Mar. 27, 1969
[45] Patented Oct. 19, 1971
[73] Assignee United Aircraft Corporation
East Hartford, Conn.

[54] LASER EMPLOYING ALIPHATIC NITRILES AS A LASING GAS
5 Claims, 2 Drawing Figs.
[52] U.S. Cl. .................................................. 331/94.5, 252/301.2
[51] Int. Cl. .................................................. H01s 3/14, H01s 3/22
[50] Field of Search ........................................ 331/94.5; 252/304.2

[56] References Cited
OTHER REFERENCES

Patel, " Selective Excitation....in N 2 – CO 2 ," Phys. Rev. Lett. 13 (21) 23 Nov. 64, pp. 617– 619.

Mathias et al. " Laser Oscillations......Hydrogen Carbon and Nitrogen" Electronics Letters, 1 (2) Apr. 1965 p. 45, 46.

Deutsch, " OCS Molecular Laser" App. Phys. Lett. 8, (12) 15 June 66.

*Primary Examiner*—Ronald L. Wibert
*Assistant Examiner*—R. J. Webster
*Attorney*—Melvin Pearson Williams ABSTRACT: A gas laser utilizes essentially vibrationally excited nitrogen or carbon monoxide as an energizing gas and, through resonant collisions with a lasing gas, transfers the energy to the lasing gas, preferentially to an upper laser energy level. The lasing gas is one of a group known as aliphatic nitriles which may either be introduced directly into the laser cavity free of prior excitation or it may be mixed with the energizing gas prior to excitation. Laser energy at wavelengths between 5 and 15 microns is produced.

PATENTED OCT 19 1971    3,614,660

INVENTOR
CASPER J. ULTEE
BY Melvin Pearson Williams
ATTORNEY

3,614,660

LASER EMPLOYING ALIPHATIC NITRILES AS A LASING GAS

BACKGROUND OF THE INVENTION

1. Field of Invention

This invention relates to gas lasers, and more particularly to a gas laser for producing radiation in the infrared.

2. Description of the Prior Art

The mechanics of gas lasers are currently well known. A great deal of attention has been paid recently to the excitation of a lasing gas to an energy level capable of emitting photons and thereby participating in stimulated emission of coherent light within a laser cavity as a result of energy preferentially transferred to the lasing gas through near-resonant collision with a vibrationally excited energizing gas. One type of gas laser which has received a great deal of attention is the nitrogen-carbon dioxide laser. In this type of gas laser, the nitrogen is excited to the first vibrational level, and it transfers energy into the upper laser level (001) of carbon dioxide preferentially, so as to provide a population inversion which supports laser emission. The emission of photons by the carbon dioxide causes the molecules thereof to assume the energy of the lower laser level (100) and molecules in this energy level rapidly decay via gas collisions to the ground state.

The method of exciting the energizing gas may vary in accordance with the particular design parameters of a given laser, as is known in the art. For instance, electric excitation may be utilized in any of several forms. One well-known form is radiofrequency excitation; another form is direct current plasma excitation; and a third known form is microwave excitation. Additionally, it is possible to excite the energizing gas by causing it to absorb intense light of a frequency matched to the spacing of the low-lying vibrational energy levels of the energizing gas. For instance, carbon monoxide may be raised to its first vibrational energy level by absorption of light with a wavelength of about 4.7 microns. Another known method of obtaining energizing gas in an excited state comprises the sudden cooling of a heated energizing gas. Thus, the energizing gas may be heated as a result of the utilization of any thermal source (such as the simple burning of fuel) or by a heating arc, and it may thereafter be caused to flow through an expansion nozzle at supersonic speeds so as to freeze the energy in the lower vibrational levels of the energizing gas while translational cooling takes place, thus providing a highly nonequilibrium population distribution with preferential excitation in the vibrational levels. In the preferred embodiment of the invention, gas temperatures equal to 1,000° K. or greater will be achieved in the energizing gas before expansion.

A recent advancement in the art comprises the technique of mixing, wherein the lasing gas is caused to mix intimately with the vibrationally excited energizing gas directly within the laser cavity to accomplish population inversion in the lasing gas so that the energizing of the lasing gas to its upper laser level or levels does not cause prelasing, and is not depleted by collisional energy transfers or other adiabatic phenomena prior to entrance into the laser cavity where the energy may participate in the generation of laser light.

In the aforementioned gas lasers, the wavelength of the laser radiation obtained depends upon the laser transitions between various energy levels. A great deal of work has been done with the carbon dioxide laser which produces laser light at 10.6 microns, and with other laser systems which produce light at various other wavelengths. These are well suited to some uses, but atmospheric absorption of light at certain frequencies limits their usefulness. Additionally, laser energy may be utilized for various useful processes, provided that light of a proper wavelength can be obtained.

It should be understood that the laser emission occurs over a band of wavelengths approximately centered on the wavelengths listed. Furthermore, due to uncertainties existing in the present art, only approximate assignments of these laser wavelengths can be made.

SUMMARY OF INVENTION

The object of the present invention is to provide a laser capable of radiation at infrared wavelengths.

According to the present invention, a lasing gas comprising an aliphatic nitrile is energized to an upper laser level of energy, whereby stimulated coherent emission of electromagnetic radiation or laser energy will result at infrared wavelengths. According further to the present invention, the lasing gas may be excited through near-resonant collisions with a vibrationally excited energizing gas comprising nitrogen or carbon monoxide.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
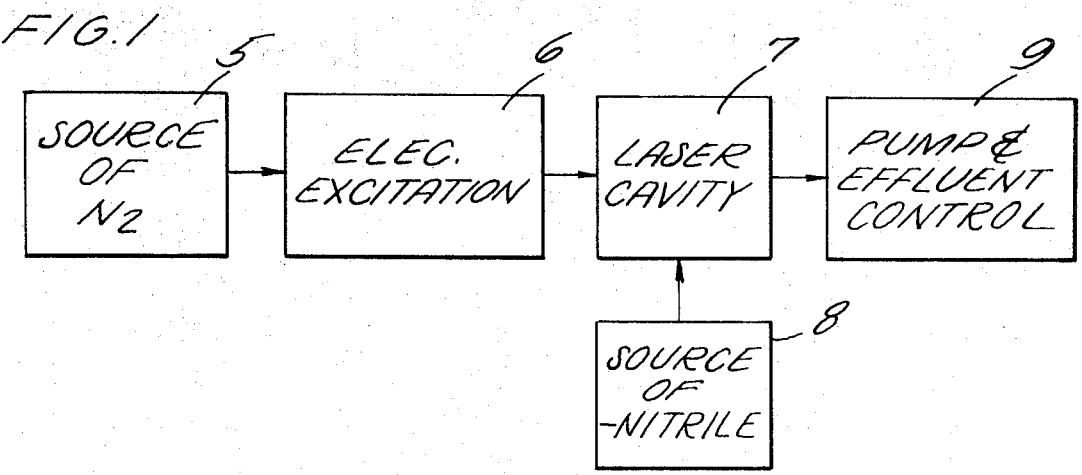
FIG. 1 is a schematic block diagram of one embodiment of a laser system in accordance with the present invention utilizing electric discharge excitation and mixing of the laser gas with a preenergized gas.

Referring now to FIG. 1, a source 5 of nitrogen or carbon monoxide energizing gas delivers the gas to an electric excitation means 6. The excitation means 6 may comprise an electric discharge of either the direct current, radiofrequency or microwave variety, as is known in the art. The excitation means 6 excites the energizing gas to vibrational levels. The techniques of electric excitation are well known in the art, and choosing among them is not germane to the present invention.

The vibrationally excited energizing gas passes from the electric excitation means 6 into a laser cavity 7 which also receives a selected organic, or aliphatic nitrile, hereinafter referred to as "-nitrile," from a source 8 of lasing gas. This gas may be chosen, for instance, from the following:

Acetonitrile or methyl cyanide ($CH_3CN$)
Trichloroacetonitrile or trichloromethyl cyanide ($CCl_3CN$)
Trifluoroacetonitrile or trifluoromethyl cyanide ($CF_3CN$)
Chloroacetonitrile or chloromethyl cyanide ($CH_2ClCN$)
Difluorochloroacetonitrile or difluorochloromethyl cyanide ($CF_2ClCN$)

Each of these gases has the following common characteristic which renders them attractive as lasing gases. The R-CN grouping in these molecules gives rise to a characteristic frequency between 2,100 and cm¹2,300 cm.¹¹ due to the stretching vibration of the C-N bond. Thus these molecules have a vibrational energy level near-resonant with the vibrational levels of nitrogen or carbon monoxide molecules. These levels may be propulated by a collisional exchange process, similar to that described above for the $N_2$-$CO_2$ laser. In addition, these molecules have low-lying energy levels which can serve as lower levels for stimulated emission process. The lasing gas is preferably introduced into the laser cavity at a relatively low temperature, such as room temperature. Methods of accomplishing efficient mixing of the gas are known in the art. This causes intimate mixing of the vibrationally excited energizing gas with the lasing gas within the optical cavity so that essentially each molecule of lasing gas which is brought to an upper lasing level of energy will emit photons directly within the laser cavity, therefore avoiding prelasing or spontaneous vibrational equilibration processes which would remove molecules of lasing gas from the upper laser level of excitation. Additionally, the use of the mixing configuration illustrated in FIG. 1 may be preferred in order to avoid possible reduction in efficiency and other side effects as a result of a tendency for the lasing gas to undergo chemical reactions or decomposition as a result of the energy imparted thereto within the electric excitation means 6.

The flow of the gas from the source 1, through the electrical excitation means 2 and the laser cavity 3 is caused by suitable pump and effluent control means 5. The pump and effluent control means 5 may provide not only for flow through the system, but high flow at a relatively low pressure to accommodate the electric discharge involved in the excitation means 2. The pump and effluent control means 5 may also provide for combustion or chemical destruction of the effluent so as to avoid releasing toxic gas. As an alternative, however, a leak-tight closed cycle system may be employed if desired without altering the practice of the essential teachings of the present invention.

The technique of mixing the preferably room-temperature lasing gas into the excited energizing gas promotes a favorable energy transfer process leading to a population inversion as between an upper lasing level and lower levels. The general principles of this process may be seen from the following example:

$$N_2(\nu 1) + CCl_3CN \text{ (ground state)}$$
$$N_2(\nu 0) + CCl_3CN(\nu 1, v=1)$$
$$\Delta E = 84 \text{cm}^{11}$$

This near-resonant exchange process leads to selective pumping of the $\nu_1$, level of $CCl_3CN$ at 2,250 cm.$^{11}$ and an inversion between this level and the lower levels of $CCl_3CN$ is established. Within a suitable cavity, lasing between the $\nu_1$ level and several of the lower levels can occur. For example:

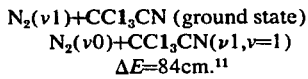

| Upper Level | Lower Level | Approximate Wavelength |
| --- | --- | --- |
| $\nu_1$ 2,250 cm.$^{11}$ | $\nu_5$ 163 cm.$^{11}$ | 4.8 μ |
| $\nu_1$ 2,250 cm.$^{11}$ | $\nu_4$ 320 cm.$^{11}$ | 5.2 μ |
| $\nu_1$ 2,250 cm.$^{11}$ | $\nu_3$ 490 cm.$^{11}$ | 5.7 μ |
| $\nu_1$ 2,250 cm.$^{11}$ | $\nu_2$ 1,029 cm.$^{11}$ | 8.2 μ |

As is well known in the art, the efficiency of a molecular laser, such as is described above, may be enhanced by the addition of gases, such as He, $H_2$ and $H_2O$, which promote the depopulation of the lower laser levels.

To produce self-sustained lasing in the flow, the laser cavity should be coextensive with the region of flow containing a finite population inversion between the upper and lower laser levels.

Figure 2:
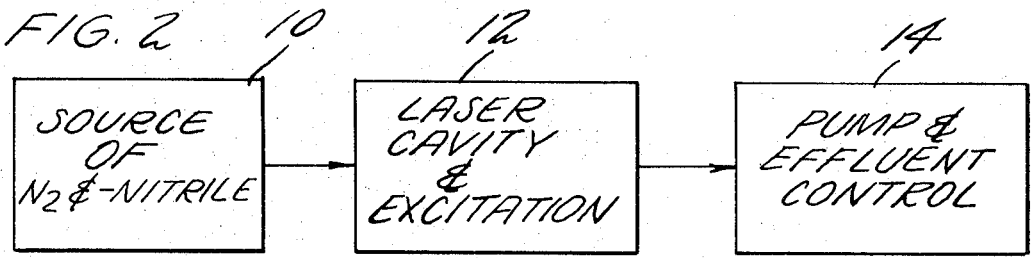
FIG. 2 is a schematic block diagram of another embodiment of a laser system in accordance with the present invention in which the gases of the laser are excited in, or just prior to entering the laser.

The second embodiment of the invention is illustrated in FIG. 2. This embodiment illustrates that the energizing gas and lasing gas may be mixed in a source 10 prior to being passed through an excitation means, which may in fact consist of a laser cavity with electric excitation means 12, as is known in the art. The outflow of the cavity with electric excitation is passed through a pump and effluent control means 14, as in the case of the embodiment of FIG. 1. FIG. 2 illustrates that the excitation of an energizing gas can take place after the energizing gas is mixed with the lasing gas. FIG. 2 also illustrates that the excitation means may be incorporated directly within the laser cavity so the excitation occurs within the laser cavity. FIG. 2 further illustrates, moreover, a configuration which may be utilized wherein the energizing gas is not employed: that is, the source 10 may be a source only of lasing gas, or of lasing gas and a gas suitable to assist in adjusting the cross section of the lasing gas to improve the absorption capability of the lasing gas for direct excitation by the excitation means, without involving the near-resonant collisional energy transfer process with an energizing gas. All of this is known in the art and is not germane to the present invention which is to utilize an aliphatic nitrile as a lasing gas.

Although the invention has been shown and described with respect to preferred embodiments thereof, it should be understood by those skilled in the art that various changes and omissions in the form and detail thereof may be made therein, without departing from the spirit and the scope of the invention.

Having thus described a typical embodiment of my invention, that which I claim as new and desire to secure by Letters Patent of the United States is:

1. In a gas laser of the type having a source of energizing gas selected from the group consisting of nitrogen and carbon monoxide, means for vibrationally exciting the energizing gas, a laser cavity, a source of lasing gas, and means causing the flow of lasing gas and vibrationally excited energizing gas through the laser cavity so that the energy of the energizing gas is transferred to a lasing level of the lasing gas, the improvement comprising:
   said lasing gas comprising a substantially undissociated aliphatic nitrile.

2. The gas laser according to claim 1 wherein said source of energizing gas and said source of lasing gas comprise a single source supplying gas to said exciting means.

3. In the method of operating a gas laser having a laser cavity, the steps of:
   flowing vibrationally excited energizing gas selected from the group consisting of molecular nitrogen and carbon monoxide through said cavity; and
   contacting a second gas stream with said energizing gas in the laser cavity, said second gas stream consisting of a lasing gas which is predominantly a substantially undissociated aliphatic nitrile, whereby the energy of said vibrationally excited molecular nitrogen is transferred to the lasing level of the lasing gas.

4. In the method according to claim 3, the further step of:
   adjusting the optical parameters of said laser cavity so as to provide laser radiation over a band of wavelengths centered at a wavelength of between 5 and 15 microns.

5. The method according to claim 3 wherein said aliphatic nitrile is selected from the group consisting of $CH_3CN$, $CCl_3CN$, $CF_3CN$, $CH_2ClCN$ and $CF_2ClCN$.